(12) United States Patent
Rhee et al.

(10) Patent No.: US 9,075,912 B2
(45) Date of Patent: Jul. 7, 2015

(54) METHOD AND SYSTEM FOR SOFTWARE SYSTEM PERFORMANCE DIAGNOSIS WITH KERNEL EVENT FEATURE GUIDANCE

(71) Applicant: NEC Laboratories America, Inc., Princeton, NJ (US)

(72) Inventors: Jungwhan Rhee, Princeton, NJ (US); Guofei Jiang, Princeton, NJ (US); Kenji Yoshihira, Princeton Junction, NJ (US); Hui Zhang, Princeton Junction, NJ (US)

(73) Assignee: NEC Laboratories America, Inc., Princeton, NJ (US)

(*) Notice: Subject to any disclaimer, the term of this patent is extended or adjusted under 35 U.S.C. 154(b) by 360 days.

(21) Appl. No.: 13/850,562

(22) Filed: Mar. 26, 2013

(65) Prior Publication Data

US 2014/0115403 A1 Apr. 24, 2014

Related U.S. Application Data

(60) Provisional application No. 61/615,563, filed on Mar. 26, 2012.

(51) Int. Cl.
*G06F 11/00* (2006.01)
*G06F 11/36* (2006.01)
*G06F 11/34* (2006.01)

(52) U.S. Cl.
CPC ........... *G06F 11/3636* (2013.01); *G06F 11/34* (2013.01); *G06F 11/3466* (2013.01); *G06F 2201/86* (2013.01); *G06F 2201/865* (2013.01)

(58) Field of Classification Search
USPC ....................................... 714/38.1
See application file for complete search history.

(56) References Cited

U.S. PATENT DOCUMENTS

| 6,714,976 | B1* | 3/2004 | Wilson et al. | 709/224 |
| 6,874,105 | B2* | 3/2005 | Buechner et al. | 714/39 |
| 2011/0179316 | A1* | 7/2011 | Geuzebroek et al. | 714/48 |
| 2012/0042212 | A1* | 2/2012 | Laurenti | 714/45 |

* cited by examiner

*Primary Examiner* — Sarai Butler
(74) *Attorney, Agent, or Firm* — Joseph Kolodka (57) ABSTRACT

A method includes generating a normal trace in a training stage for the monitored software systems and a monitored trace in the deployment stage for anomaly detection, applying resource transfer functions to traces to convert them to resource features, and system call categorization to traces to convert them to program behavior features, performing anomaly detection in a global scope using the derived resource features and program behavior features, in case the system finds no anomaly, generating no anomaly report, in case the anomaly is found, including the result in an anomaly report; and performing conditional anomaly detection.

20 Claims, 3 Drawing Sheets

METHOD AND SYSTEM FOR SOFTWARE
SYSTEM PERFORMANCE DIAGNOSIS WITH
KERNEL EVENT FEATURE GUIDANCE

RELATED APPLICATION INFORMATION

This application claims priority to provisional application No. 61/615,563 filed Mar. 26, 2012, the contents thereof are incorporated herein by reference

BACKGROUND OF THE INVENTION

The present invention relates generally to software system performance diagnosis, and more particularly, to software system performance diagnosis with kernel event feature guidance.

Localizing performance anomalies in enterprise software systems have constraints different from conventional debugging environments. A monitoring agent for deployed systems should run efficiently with minimal overhead. Otherwise performance overhead of the monitoring software can hide the performance problems. While using the source code is effective for debugging, in a typical scenario using commercial off-the-shelf (COTS) software, administrators lack knowledge of the software. Moreover the source code of third party software components is often not available. Efficient performance debugging without requiring source code is in huge demand for production systems.

There have been several major approaches in traditional program debugging to localize performance anomalies.

Traditional debugging takes application programs executed in a special debugging mode (e.g., single-step mode, ptrace, and dynamic compilation). While this approach provides fine grained control and detailed information deep inside the program, it inhibits the observance of workload with the full fidelity because the overhead of the monitor prevents the program from executing in the full production-level speed.

Other approaches embed a monitoring agent into the program by modifying source code and observes the program's behavior in a fine grained way. This white-box approach has advantages in profiling and categorizing the application status since internal information such as functions or objects are available [7, 8]. However, often the proprietary software is provided in a binary format and third-party software comes without source code information. This requirement for source code availability limits the applicability of this approach for a wide set of software.

There is another approach that uses low level events (e.g., system calls) to determine application status. Since this approach does not rely on software's internal knowledge, it is called a black-box approach. Compared to other two approaches, this solution has the advantage that it can monitor software without involving the constraints in the application level. Another work models application behavior by building paths of kernel events. The collected traces in this work are treated as homogeneous traces. In real deployment scenarios, high complexity and diverse set of functions of enterprise applications generate a highly dynamic set of operations in the application behavior. The assumption on homogeneous behavior can trigger false alarms since different types of application activities can be considered as anomaly.

Accordingly, there is a need for request profiling in service systems with kernel events.

BRIEF SUMMARY OF THE INVENTION

The invention is directed to a method for software system performance diagnosis with kernel event feature guidance that includes receiving input information for low level kernel events from a training execution of the software system and a production system monitoring for an anomaly; processing the input information in a trace generation providing a first set of transaction traces from a normal training scenario and a second set of traces generated from the same system in the production scenario, determining by an anomaly trace localization procedure whether there exists an anomaly by comparing information from the first and second set of traces in a global scope, applying a fine grained anomaly check by an anomaly event localization procedure responsive to an anomaly determined by the preceding anomaly trace localization procedure, and obtaining an anomaly status from the determining or applying steps.

In a similar aspect of the invention there is provided a system for software system performance diagnosis with kernel event feature guidance that includes a training execution of the software system and a production system monitoring for an anomaly for kernel events inputs; trace executions from training and monitored executions for providing a first set of transaction traces from a normal training scenario and a second set of traces generated from the same system in the production scenario, an anomaly trace localization procedure for determining whether there exists an anomaly by comparing information from the first and second set of traces in a global scope; and an anomaly event localization procedure for applying a fine grained anomaly check responsive to an anomaly determined by the preceding anomaly trace localization procedure.

These and other advantages of the invention will be apparent to those of ordinary skill in the art by reference to the following detailed description and the accompanying drawings.

DETAILED DESCRIPTION

The present invention is directed to a new monitoring architecture to address the aforementioned challenges in the existing approaches. This approach uses operating system kernel events as input. Therefore it does not require source code or instrumentation of application programs. On top of it, this approach introduces several technologies to solve the problem.

The invention uses a new metric called system resource features which represent the resource usage statistics of kernel events. This information is obtained by applying resource transfer functions to kernel events. These features provide means to observe behavior of kernel events in various resources. By monitoring any significant change in each resource metric, we can identify anomalous behavior of kernel events.

The diverse sets of application behavior do occur and they need to be differentiated. Otherwise, comparing and treating such heterogeneous patterns as homogeneous would cause false positives. The invention solves this problem by inferring the characteristic of application code using the distribution of system call vector. This information is called program behavior features and they represent unique characteristics of application code.

Based on these new features, the invention applies conditional probability on the analysis of traces which enables distinguishing trace data generated from different application logic and improve the analysis by identifying outliers. The invention provides a more accurate and reliable anomaly detection when multiple types of application logics exist in traces by considering their similarities and dissimilarities.

Software system consists of one or more software components (i.e., nodes or tiers). An example is a three-tier system that is composed of a web server, an application server, and a data base server. We use low level kernel events for these nodes to monitor their status and detect anomalous status of the software systems. The kernel events generated from this system represent their interactions and operation units. For example, a multi-tier system receives a web request and serves the web content generated from multiple nodes. This request processing is one example of the transaction of this application system. The kernel events used in this request processing are collected into one trace unit based on the causal relationship of the events and this trace unit is called a transaction trace. In the following description, we also use just trace instead of transaction trace for brevity.

Figure 1:
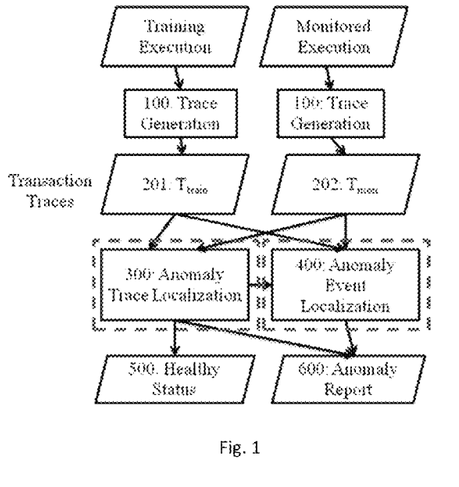
FIG. 1 is an diagram of a configuration of AppDiff, in accordance with the invention.

FIG. 1 presents the an exemplary architecture configuration of the invention, AppDiff. This system operates with two inputs, which are kernel events from a normal training execution and a production system monitored for anomaly. These input information is processed in the trace generation (100) component and turns into two sets of traces: a set of transaction traces from a normal training scenario ($T_{train}$, 201) and a set of traces generated from the same system in the production scenario ($T_{mon}$, 202). With these two sets of traces, the component 300, Anomaly Trace Localization, determines whether there exists anomaly by comparing $T_{mon}$ and $T_{train}$ in a global scope. If there is anomaly, it triggers a more fine grained anomaly test, Anomaly Event Localization (400). If no anomaly is detected, the system indicates no problem (500). Otherwise, any anomaly is recorded in the anomaly report (600).

Here is brief summary of each component.

100. Trace Generation: This component generates traces using kernel events from the monitored system.

201. Traces from Training Execution: $T_{train}$ represents the set of transaction traces that are generated before the monitoring with a workload expected in normal operation of applications.

202. Traces from Monitored Execution: $T_{mon}$ represents the set of traces data from the monitored execution.

300. Anomaly Trace Localization: This stage analyzes $T_{train}$ and $T_{mon}$ and determines any anomaly. If it determines no anomaly, it notifies health status (output 500). Otherwise it produces the anomaly report (shown in output 600) and triggers another procedure in the component 400.

400. Anomaly Event Localization: Once anomalous traces are found, a fine grained event level comparison is performed for a comparable pair of traces to help the understanding of the anomaly.

500. Healthy Status: This report indicates that the component 300 didn't find any anomaly.

600. Anomaly Report: This report describes the detailed information of the found anomaly.

The invention, AppDiff, works with two sets of input traces, a reference normal input set $T_{train}$ and a tested input set $T_{mon}$, by default. However, it can work with one set of input traces ($T_U$) if they are under a certain condition that follows. If users have domain knowledge on the resource statistics of normal behavior and the trace files representing such a normal condition are dominant in the data set, we can use $T_U$ by partitioning it into $T_{train}'$ and $T_{mon}'$ in the analysis.

100. Kernel Trace Generation

Figure 2:
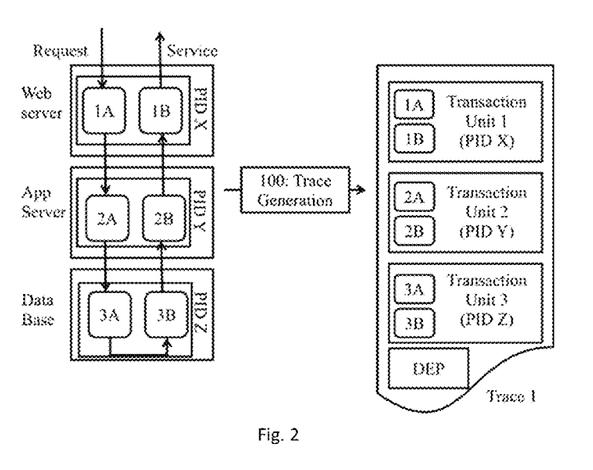
FIG. 2 is a diagram showing how traces are generated, in accordance with the invention.

FIG. 2 presents how traces are generated and several key terms used in the trace. In the left hand side of the figure, a request and its service are shown. Serving this request involves the activity of three processes (X, Y, and Z) that belong to three machines. The overall activity of this software system becomes one transaction.

The kernel events corresponding to this behavior are collected and organized into one transaction trace. Within a trace, there are multiple sub units that represent the groups of kernel events performed by the same process. In this example, the web transaction is performed by three processes having the process ID (PID) X, Y, and Z. The kernel events for each process are stored as a sub group in the trace file. This is called a Transaction Unit (TU) and it keeps characteristics of a specific process. In addition, the causal sequence of such events (1A→2A→3A→3B→2B→1B) is stored in a section (DEP) in the trace.

Kernel event monitoring software (e.g., SystemTab, DTrace, Dprobe, Mevalet) generates raw kernel events from the monitored system. In order to produce this type of trace data, it is necessary to organize the trace data into the data set for each process and traverse them as matching their communications.

Kernel Trace Fields: There are several fields for each kernel event. This is the minimal information to apply our analysis on the trace data.

Timestamp: Unique time stamp counter
PID: Unique process ID number
TU number: a serial number of a transaction unit
Event type: The kind of kernel events (e.g., interrupt event, system call event)
Event Information: Additional information (e.g., system call type for a system call event)

300. Anomaly Trace Localization

Figure 3:
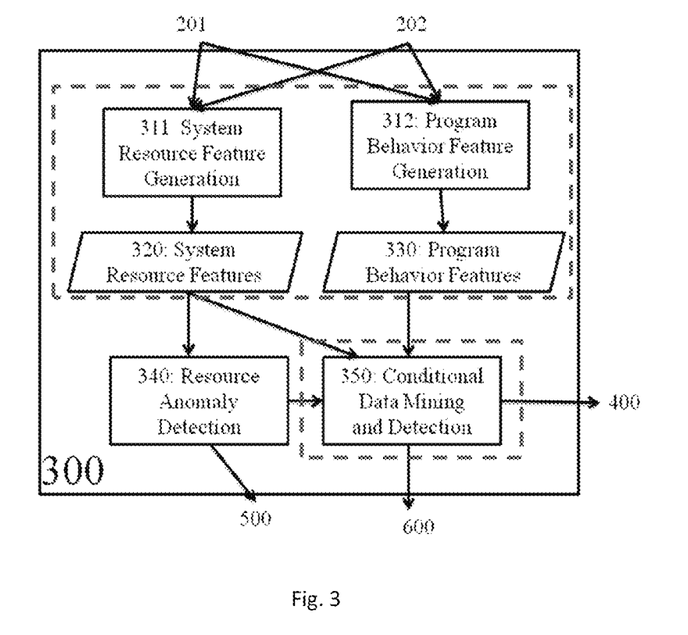
FIG. 3 is a diagram detailing anomaly trace localization, 300, shown in FIG. 1, in accordance with the invention.

FIG. 3 presents a more detailed view of the component 300. The trace files 201 and 202 are generated by the trace generation component (100) and given to this component. For each trace file, two new data (320 and 330) are generated to improve the quality of anomaly detection. In the component 340, preliminary anomaly detection is performed in the global scope. If no anomaly is found, corresponding output (500) is generated. Otherwise, another analysis component (350) is trigger. Provided below is a detailed explanation of each component below.

311. System Resource Feature Generation

Figure 4:
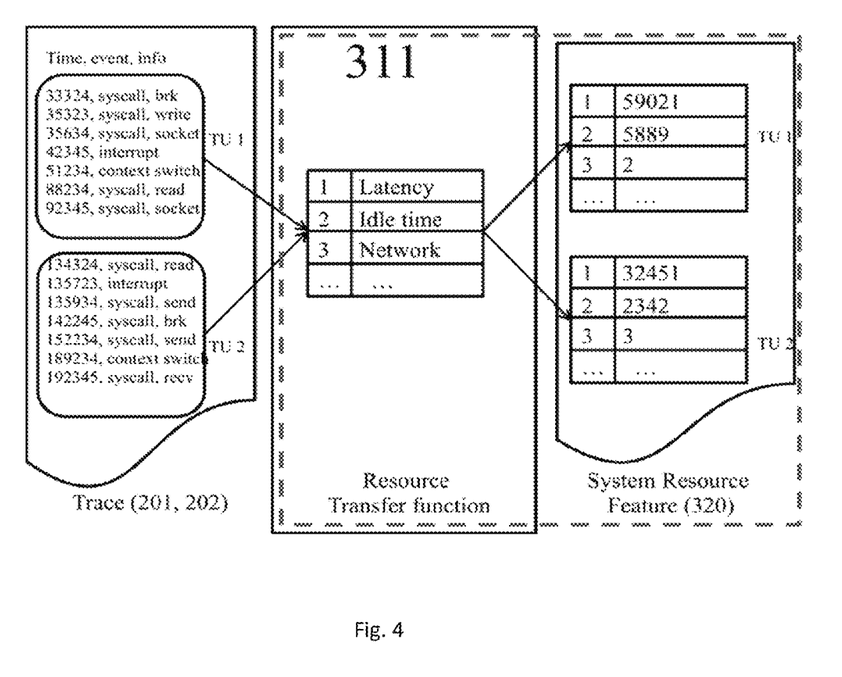
FIG. 4 is a diagram detailing generation of system resource features, 311, shown in FIG. 3, in accordance with the invention.

This component generates a new perspective of trace information in various resource usages. This information is called System Resource Features (320). The resource transfer functions are defined to convert kernel events to a set of resource information in a uniform way. The mapping between the trace events and resource information may not be one-to-one. For example, the latency function measures the time spent on the transaction unit. The idle function counts time periods in context switch. Network activity is measured by the number of kernel events related to networking. This information is encoded into the data structure called the system resource vector. FIG. 4 shows the conversion process from trace events to system resource vectors.

```
Input:
    A set of transaction traces: T = { T_t }, t is the index for traces, |T| = N, 1 ≤ t ≤ N,
    A set of resource transfer functions: F = { f_l }, l is the index of a resource transfer function,
    |F| = L, 1 ≤ l ≤ L
Output:
    A set of system resource vectors: R
GenerateSystemResourceFeatures(T,F) (311)
    R = Ø
    // for each trace
    for each T_t in T:
        // for each transaction unit
        for each transaction unit q in T_t:
            r_{t,q} = {0, ..., 0} // |r_{t,q}| = L
            for each f_l in F:
                r_{t,q}[l] = f_l(q)
            end for
            R[t,q] = r_{t,q}
        end for
    end for
    return R
```

Here are some examples of resource transfer functions.

$f_{latency}(q) = |t_N - t_1|, e_j \in q, t_j$ is the time stamp for $e_j, 1 \le j \le |q|$ $$f_{idle}(q) = \sum_{x=1}^{p} \text{idle time}_x$$

Idle time is defined using specific sequences of kernel events.

$f_{network}(q) = |Q|, Q = \{e_j | e_j \in q, e_i \in \phi_{network}\}$ $\phi_{network}$ is the set of kernel events related to networking.

330. Program Behavior Features

Figure 5:
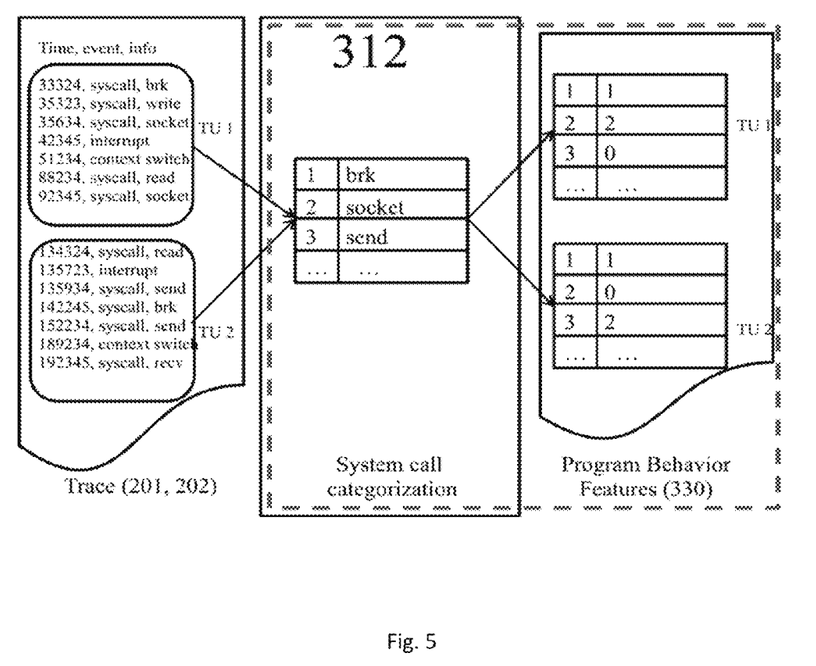
FIG. 5 is a diagram detailing generation of program behavior features, 312, shown in FIG. 3, in accordance with the invention.

In black-box approaches, internal knowledge on application program is missing due to the absence of source code. We present a scheme to provide a new perspective of trace information showing what application code triggered kernel events. The insight behind our solution is that the same user code is likely to trigger a similar set of system call events. Thus our hypothesis is that the system call vector distribution can represent the characteristics of application code. We observed that many software systems have multiple functions which produce various transaction traces. This scheme allows our anomaly detector to differentiate the traces caused by different code.

```
Input:
    A set of transaction traces: T = { T_t }, t is the index for traces, |T| =
    N, 1 ≤ t ≤ N,
Output:
    system call vector V = {v_t}
GenerateProgramBehaviorFeatures(T) (312)
    V = Ø
    // for each trace
    for each T_t in T:
        total = 0
        for each transaction unit q in T_t:
            v_{t,q} = {0, 0, ..., 0} // |v_{t,q}| = K, K is the total number of system calls.
            for each e_j = {time, event_type, info} in q :
                if event_type == system_call:
                    v_{t,q} [info] += 1
                    total += 1
            end for
            V[t,q] = v_{t,q}
        end for
    end for
    return V
```

340. Resource Anomaly Detection

With the system resource features extracted from the two sets of traces, this component detects anomaly which is determined as the difference described below. If none of metrics have significant differences, it reports no problem (500). Otherwise, conditional data mining component (350) is executed to find any outliers. The output of this component is a set of anomalous resource indices.

```
Input:
    R_{train} = {r_{train}}, R_{mon} = {r_{mon}}, T_{train}, T_{mon}
    | R_{train} | = | R_{mon} | = N, | r_{train} | = | r_{mon} | = L
    Thres_A, Thres_B: thresholds for anomaly detection
Output:
    A = {a set of anomalous resource indices}
    ResourceAnomalyDetection(R_{train}, R_{mon}, T_{train}, T_{mon}, Thres_A, Thres_B)
    // anomaly detection using general system behavior
    A = Ø
    for l =1 to L // for each system resource metric
        // Calculate the average and standard deviation of traces
        μ_{train,l}, σ_{train,l} ← R_{train}
        μ_{mon,l}, σ_{mon,l} ← R_{mon}
        // Average based anomaly detection
        if(μ_{mon,l} ≥ μ_{train,l} + Thres_A * σ_{train,l}) ∨ (μ_{mon,l} ≤ μ_{train,l} - Thres_A * σ_{train,l}):
            anomaly_amt = |μ_{train,l} - μ_{mon,l}|/μ_{train,l}
            A.add((l, 1, anomaly_amt))
        // Probability based anomaly detection
        P_{train} = |{ e_k|e_k ≥ avgT, e_k ∈ T_{train}}|/|T_{train}|
        P_{mon} = |{ e_k|e_k ≥ avgT, e_k ∈ T_{mon}}|/|T_{mon}|
        if (P_{mon} ≥ P_{train} * (1 + Thres_{B,l})) or (P_{mon} ≤ P_{train} * (1 - Thres_{B,l})):
            anomaly_amt = |P_{mon} - P_{train}|
            A.add((l, 2, anomaly_amt))
    end for
    return A
```

350. Conditional Data Mining and Anomaly Detection

Figure 6:
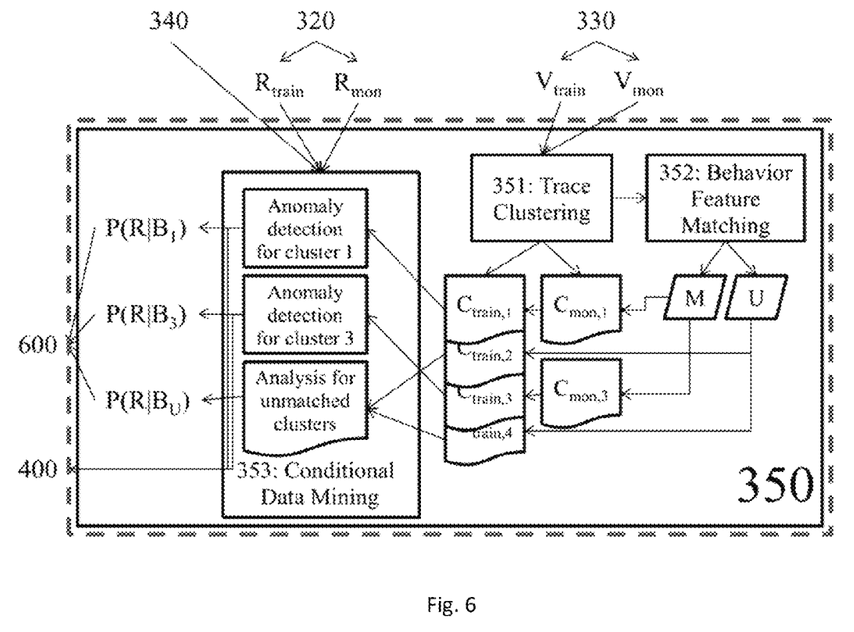
FIG. 6 is a diagram detailing conditional data mining and anomaly detection, 350, shown in FIG. 3, in accordance with the invention.

Given the list of resource metrics having anomalies, this component further investigates whether they are true positives. It uses behavior features to rule out outliers, which are the cases that the anomalous resource usages are caused by different kind of application logics. Specifically, first traces are clustered based on program behavior features. Then it is tested whether the clusters from data set have a similar counterpart in terms of behavior patterns to determine whether they are comparable. For the cluster pair having the matched behavior pattern, anomaly detection module is applied in the cluster level.

351. Trace Clustering

Traces are clustered by using the program behavior features. For the clustering method, we used connectivity based clustering (also called hierarchical clustering) with a threshold (Thres$_C$) in the distance function. It uses agglomerative method (bottom-up approach) and single-linkage (nearest neighbor approach) is used to connect clusters.

Here a and b stand for traces and the program behavior features (i.e., system call vectors) of these traces are represented as $v_a$ and $v_b$. A and B are the clusters of traces.

Linkage criteria:
min{d(a,b): a∈A, b∈B, d(a, b)≤Thres$_C$}

The distance function for the comparison of system call vectors uses Euclidean distance:

$$d(a, b) = \begin{cases} \frac{\|v_a \cup v_b\| - \|v_a \cap v_b\|}{\|v_a \cup v_b\|}, & \|v_a \cup v_b\| > 0 \\ \infty, & \|v_a \cup v_b\| = 0 \end{cases}$$

$$= \begin{cases} \frac{\sum_{i=1}^{K} \max(v_a[i], v_b[i]) - \sum_{i=1}^{K} \min(v_a[i], v_b[i])}{\sum_{i=1}^{K} \max(v_a[i], v_b[i])}, & \|v_a \cup v_b\| > 0 \\ \infty, & \|v_a \cup v_b\| = 0 \end{cases}$$

Each trace pair in the trace set will be compared by applying the distance function on their program behavior features and they are connected if their distance is less than the threshold value.

352. Behavior Feature Matching

After two sets of input traces, $T_{train}$ and $T_{mon}$, are clustered, we need to determine which clusters are comparable. These clusters are categorized as either of two groups, M (matched groups) and U (unmatched groups), depending on whether they have the counterpart with similar behavior features in $T_{train}$ and $T_{mon}$.

The clusters in the matched group compare their traces from $T_{train}$ and $T_{mon}$. The clusters in the unmatched group represent the traces generated by the application code patterns that are significantly different from the training run. Since they do not have the matched counterparts in trace sets, they are analyzed in an aggregated way or by manual specification.

The matching criteria of behavior features are based on the combination of the system call distance function and the common kinds of system calls. ρ balances these two factors. The compared two vectors are matched if the calculated value is same or less than the threshold (Thres$_R$).

match($v_a$, $v_b$) =
$$\begin{cases} \text{True}, & \rho * \frac{\|v_a \cup v_b\| - \|v_a \cap v_b\|}{\|v_a \cup v_b\|} + (1-\rho) * \frac{|C(v_a, v_b)|}{|C'(v_a, v_b)|} \leq Thres_R \\ \text{False}, & \text{otherwise} \end{cases}$$

$C(v_a, v_b) = \{i \mid (v_a[i] > 0 \text{ and } v_b[i] = 0) \text{ or } (v_a[i] = 0 \text{ and } v_b[i] > 0)\}$ $C'(v_a, v_b) = \{i \mid v_a[i] > 0 \text{ or } v_b[i] > 0\}$

353. Conditional Data Mining

In our anomaly detection, we use conditional probability to determine anomaly. The conditions provide more precise context to the set of events analyzed for anomaly. Therefore, they enable us to improve the detection ratio.

There are several conditions that can be used for this purpose. In our analysis, program behavior features are one major usage of the condition. Let R denote the anomaly condition derived from system resource features (e.g., latency>5 seconds) and B denote the refined trace set using program behavior features (e.g., traces having the system call distribution X). Then the probability used in this new anomaly detection is represented as P(R|B). This is the conditional probability using the traces clustered based on the behavior features. This reflects the application logic triggering system call events. It allows us to determine whether the traces are comparable. Using Bayes' theorem, this formula can be written as the following.

$$P(R \mid B) = \frac{P(R \cap B)}{P(B)} = \frac{P(B \mid R)P(R)}{P(B)}$$

Here if all traces were homogeneous, meaning that they are generated by the same application logic (P(B|R)=P(B)=1), it will lead to P(R|B)=P(R). However, if the traces are generated by more than one application logic, using P(R) without knowing the differences in the application logic would cause false alarms. Instead we determine anomaly based on the conditioned probability P(R|B$_k$) (k is the index for a specific behavior cluster) which is calculated by the statistics from clustered traces.

In addition to program behavior features, we also use other conditions in the resource amount (e.g., idle time>value). The number of applied conditions can be also more than one.

Anomaly Detection in Cluster k

The trace clusters that belong to the match set are compared for anomaly detection. Anomaly is detected by using the factors, P(R$_{train}$|x∈C$_{train,k}$) and P(R$_{mon}$|x∈C$_{mon,k}$). This is respectively calculated by $$P(R_{train} \mid x \in C_{train,k}) = \frac{P(R_{train} \cap x \in C_{train,k})}{P(C_{train,k})}$$

$$P(R_{mon} \mid x \in C_{mon,k}) = \frac{P(R_{mon} \cap x \in C_{mon,k})}{P(C_{mon,k})}$$

This is the probability of anomalous trace conditioned by the cluster. The method for calculating these values and determining anomaly is similar to the algorithm shown in Resource Anomaly Detection (340). The difference is that the input is constrained as the clusters, C$_{train,k}$ and C$_{mon,k}$ instead of T$_{train}$ and T$_{mon}$.

Anomaly Detection in Unmatched Clusters

The traces which do not have matched program behavior features mean that their application logic is significantly altered from the ones in the training stage. The statistics of such traces show how much portion of whole traces became different in the monitored execution. The set of these traces represents the abnormality of the monitored trace set in an aggregated way.

Triggering Event Level Comparison

If any anomaly is found in the comparison of a matched cluster pair, a finer grained analysis in the event level is performed on the clusters. In FIG. 6, this control flow is shown as the arrows going to the component 400. The assumption in this analysis is that the compared traces have a similar structure, but their differences can reflect the root cause of the performance problem. In case of unmatched clusters, this analysis can be initiated by specifying the traces.

400. Anomaly Event Localization:

The input to this component is a pair of clusters (one cluster from a training run and the other cluster from the monitored run) and the anomaly resource list. For each anomaly resource index l, a representative trace is selected from each trace cluster. The selection of traces is performed by policies. Depending on what kind of operation causes a problem and how much impact is caused by the problem, there could be different best policies for different cases. We use several policies to solve problems.

Policy$_{train,k}$: As one policy for a normal trace (T$_{train,k}$), we can choose the trace having the closest resource value to the average of C$_{train,k}$. This policy assumes the trace with the average value would be most representative. Another policy is to choose the trace that has the smallest distance in program behavior features from T$_{mon,k}$. This choice is based on the assumption that having the similar structure will help to distinguish the events unique to the problem and identify the root cause.

Policy$_{mon,k}$: For the anomaly trace (T$_{mon,k}$), one policy is to choose the trace with the resource value with the biggest difference from the average value of C$_{train,k}$. This choice is based on the assumption that this characteristic is likely to reflect the most number of anomalous events that can be helpful to identify the root causes of the problem.

Figure 7:
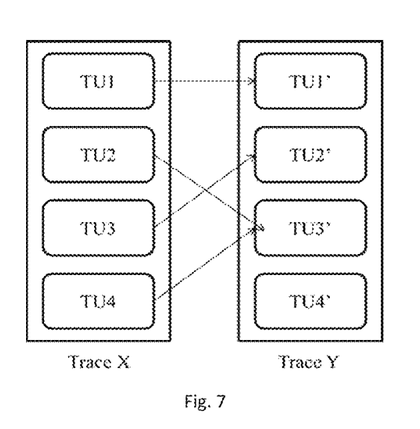
FIG. 7 is a diagram showing matching transaction units, in accordance with the invention.

Policy$_{TU}$: When two traces are compared, in fact pairs of transaction units are compared. These pairs of TUs are chosen by policies. One policy could be choosing the TU having the closest system call distance to the other TU. The compared traces may not have the same number of TUs. This is shown in FIG. 7. Even in such case, pairs of TUs can be flexibly matched using this scheme as shown in the Figure. After that, a selected pair of TUs is compared using the Longest Common Subsequence (LCS) algorithm. The differences are manually examined by developers to understand the root cause of the anomaly. This result is included in the anomaly report (600).

Event Filtering: Traces contain not only kernel events representing application characteristics but also random events which occur non-deterministically such as interrupts. These events are filtered out in the preprocessing stage.

```
Input: C_train,k, C_mon,k, R_train,k, R_mon,k, A (anomaly resource list)
Output: D : a set of different events and their indices
DiffEvents(C_train,k, C_mon,k, R_train,k, R_mon,k, A)
D = Ø
for each (l, anomaly_amt) in A:
    // selecting representative traces
    T_train,k ← Select a trace in C_train,k with Policy_train,k
    T_mon,k ← Select a trace in C_mon,k with Policy_mon,k
    // Filtering non-deterministic kernel events
    T_train,k' ← Filter(T_train,k)
    T_mon,k' ← Filter(T_mon,k)
    for each transaction unit q in T_mon,k':
        q' = Select a transaction unit in T_train,k' with Policy_TU
        diff = LCS(q, q')
        D.add(l, index for q, index for q', diff)
    end for
end for
return D
```

From the foregoing, it can be appreciated that the present invention achieves higher quality of anomaly detection by improving the accuracy of analysis results. It can rule out outliers by utilizing two newly introduced application characteristics regarding resource usages and program behavior. Due to its higher quality in the anomaly report, it is expected to lower the cost of performance debugging in applications.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for software system performance diagnosis with kernel event feature guidance, comprising the steps of:
    receiving input information for low level kernel events from a training execution of the software system and a production system monitoring for an anomaly;
    processing the input information in a trace generation providing a first set of transaction traces from a normal training scenario and a second set of traces generated from the same system in the production scenario;
    determining by an anomaly trace localization procedure whether there exists an anomaly by comparing information from the first and second set of traces in a global scope;
    applying a fine grained anomaly check by an anomaly event localization procedure responsive to an anomaly determined by the preceding anomaly trace localization procedure; and
    obtaining an anomaly status from the determining or applying steps.

2. The method of claim 1, wherein said anomaly trace localization procedure includes generating system resource features comprising: generating a new perspective of trace information in various resource usages, said trace information being system resource features, defining resource transfer functions for converting kernel events to a set of resource information in a uniform way; mapping between trace events and resource information possibly not being one-to-one; measuring network activity by a number of kernel events related to networking; and information responsive to the measuring step being encoded into a data structure called a system resource vector.

3. The method of claim 1, wherein said anomaly trace localization procedure includes generating program behavior features comprises:
    providing a perspective of trace information showing what application code triggered kernel event; and
    differentiating traces caused by different codes.

4. The method of claim 1, wherein said anomaly trace localization includes trace clustering comprising:
    clustering traces by using program behavior features, said clustering using connectivity based clustering with a threshold in a distance function with a bottom-up approach and single-linkage being used to connect clusters.

5. The method of claim 1, wherein said anomaly trace localization includes behavior feature matching comprising:
    determining which clusters are comparable responsive to the first and second sets of input traces being clusters,
    comparing traces from the first and second sets of input traces for clusters in a matched group;
    representing traces generated by application code patterns that are different from a training run for unmatched clusters, the unmatched clusters being analyzed in an aggregated way of by way of manual specification; and
    basing matching criteria of behavior features on a combination of system call distance and common kinds of system calls.

6. The method of claim 1, wherein said anomaly trace localization includes conditional data mining comprising;
   detecting an anomaly in trace clusters that belong to a match set using predetermined probability factors;
   detecting an anomaly in unmatched clusters responsive to traces which do not have matched program behavior features indicating that their application logic is altered from ones in a training stage, statistics of these traces showing how much portion of whole traces become different in a monitored execution; and
   performing a finer grained analysis in an event level on clusters for which any anomaly is found in a comparison of a matched cluster pair.

7. The method of claim 1, wherein said anomaly event localization comprises:
   a normal trace policy said normal trace policy can be based on choosing a trace having a closest resource value to a predetermined average value and this policy or it can be based on choosing a trace that has a smallest distance in program behavior features from an anomaly trace;
   an anomaly trace policy for choosing a trace with a resource value with a biggest difference from said predetermined average value;
   a comparison trace policy for comparing traces; and
   an event filter for filtering out in a preprocessing stage random events which occur non-deterministically, such as interrupts, and can be in traces with kernel events representing application characteristics.

8. The method of claim 7, wherein said comparison trace policy comprises choosing a transaction unit having a closest system call distance to another transaction unit, with compares traces possibly not having a same number of transaction units, pairs of transaction units can be flexibly matched and after that a selected pair of transaction units is compared using a longest common subsequence procedure with differences being manually examined to understand a root cause of the anomaly.

9. A system for software system performance diagnosis with kernel event feature guidance, comprising:
   a training execution of the software system and a production system monitoring for an anomaly for kernel events inputs;
   trace executions from training and monitored executions for providing a first set of transaction traces from a normal training scenario and a second set of traces generated from the same system in the production scenario;
   an anomaly trace localization procedure for determining whether there exists an anomaly by comparing information from the first and second set of traces in a global scope; and
   an anomaly event localization procedure for applying a fine grained anomaly check responsive to an anomaly determined by the preceding anomaly trace localization procedure.

10. The system of claim 9, wherein said anomaly trace localization procedure includes generating system resource features comprising:
   generating a new perspective of trace information in various resource usages, said trace information being system resource features,
   defining resource transfer functions for converting kernel events to a set of resource information in a uniform way;
   mapping between trace events and resource information possibly not being one-to-one;
   measuring network activity by a number of kernel events related to networking; and
   information responsive to the measuring step being encoded into a data structure called a system resource vector.

11. The system of claim 9, wherein said anomaly trace localization procedure includes generating program behavior features comprises:
   providing a perspective of trace information showing what application code triggered kernel event; and
   differentiating traces caused by different codes.

12. The system of claim 9, wherein said anomaly trace localization includes trace clustering comprising:
   clustering traces by using program behavior features, said clustering using connectivity based clustering with a threshold in a distance function with a bottom-up approach and single-linkage being used to connect clusters.

13. The system of claim 9, wherein said anomaly trace localization includes behavior feature matching comprising:
   determining which clusters are comparable responsive to the first and second sets of input traces being clusters,
   comparing traces from the first and second sets of input traces for clusters in a matched group;
   representing traces generated by application code patterns that are different from a training run for unmatched clusters, the unmatched clusters being analyzed in an aggregated way of by way of manual specification; and
   basing matching criteria of behavior features on a combination of system call distance and common kinds of system calls.

14. The system of claim 9, wherein said anomaly trace localization includes conditional data mining comprising;
   detecting an anomaly in trace clusters that belong to a match set using predetermined probability factors;
   detecting an anomaly in unmatched clusters responsive to traces which do not have matched program behavior features indicating that their application logic is altered from ones in a training stage, statistics of these traces showing how much portion of whole traces become different in a monitored execution; and
   performing a finer grained analysis in an event level on clusters for which any anomaly is found in a comparison of a matched cluster pair.

15. The system of claim 9, wherein said anomaly event localization comprises:
   a normal trace policy said normal trace policy can be based on choosing a trace having a closest resource value to a predetermined average value and this policy or it can be based on choosing a trace that has a smallest distance in program behavior features from an anomaly trace;
   an anomaly trace policy for choosing a trace with a resource value with a biggest difference from said predetermined average value;
   a comparison trace policy for comparing traces; and
   an event filter for filtering out in a preprocessing stage random events which occur non-deterministically, such as interrupts, and can be in traces with kernel events representing application characteristics.

16. A method to identify performance anomaly behavior in large-scale systems, comprising the steps of:
   generating a normal trace in a training stage for the monitored software systems;
   generating a monitored trace in the deployment stage for anomaly detection;
   applying resource transfer functions to traces to convert them to resource features;
   applying system call categorization to traces to convert them to program behavior features;

performing anomaly detection in a global scope using the derived resource features and program behavior features;

in case the system finds no anomaly, generating no anomaly report;

in case the anomaly is found, including the result in an anomaly report; and performing conditional anomaly detection.

17. The method of claim 16, wherein applying resource transfer functions to trace data and converting them to system resource features is a uniform way to systematically check various resource statistics of kernel events and find anomaly.

18. The method of claim 16, wherein generating program behavior features from trace data by calculating a distribution of system calls represents the inferred characteristics of application code that generate the trace data.

19. The method of claim 16, wherein conditional anomaly detection further comprises:

trace clustering, wherein traces are clustered based on the similarity of their program behavior features and a threshold;

behavior feature matching, wherein the common behavior features in trained execution and monitored execution are determined;

anomaly detection being performed for the matched clusters with the input belonging to the cluster and its output is included in the anomaly report, for each matched cluster, if anomaly is detected, Anomaly Event Localization is performed and its result is included in the anomaly report; and anomaly detection being performed for the unmatched clusters in an aggregated way or by specifying the traces to be compared with its output being included in the anomaly report.

20. The method of claim 19, wherein calculating common sets of program features in normal traces and monitored traces, a matching function is used and it is based on factors comprising;

common system call vector categories between two compared system call vectors;

Euclidean distance between two compared system call vectors;

a ratio balancing the two factors; and a threshold.

* * * * *